United States Patent Office 3,027,302
Patented Mar. 27, 1962

3,027,302
METHOD OF PRODUCING A CHOLERETIC, NON-CHOLAGOGIC EFFECT WITH ALPHA-HYDROXYPHENYLCYCLOHEXYL BUTYRIC ACIDS
Massimo Carissimi and Franco Ravenna, Milan, Italy, assignors to Maggioni & C. S.p.A., Milan, Italy, a company of Italy
No Drawing. Filed Nov. 24, 1959, Ser. No. 855,023
Claims priority, application Italy Dec. 15, 1958
5 Claims. (Cl. 167—65)

The present invention relates to choleretic drugs and to a method for inducing, in human beings, a choleretic, noncholagogic action.

It is an object of the present invention to provide an intensive and long lasting choleretic action by employing drugs which exhibit a choleretic action without any accompanying cholagogic effect and have an extremely low toxicity.

Another object of the present invention is to provide choleretic, non-cholagogic drugs having a very good tolerability by the patients and exhibiting no undesirable side effects.

Other objects and advantages of the compounds and the method according to the present invention will be apparent from the following detailed description.

This invention relates, more particularly, to alphahydroxyphenyl-cyclohexyl butyric acids corresponding to the general structural formula:

wherein R is

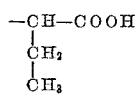

and to the nontoxic, pharmacologically acceptable esters and salts of said acids.

Thus, the present invention contemplates, inter alia, the use of the alpha-(1-hydroxy-2-phenylcyclohexyl-1) butyric, the alpha-(1-hydroxy-3-phenylcyclohexyl-1) butyric and the alpha-(1-hydroxy-4-phenylcyclohexyl-1) butyric acids: of these, the latter has proven to be the most effective in the therapeutical practice, as will be shown in detail hereinafter.

The alpha-hydroxyphenyl-cyclohexyl butyric acids of the present invention have shown an intensive choleretic action, without however exhibiting any cholagogic action; they have been perfectly tolerated by persons suffering biliary insufficiencies arising from or associated with other serious pathological conditions, and whose ages ranged from 24 to 72 years.

The method according to the invention is a method of producing a choleretic, non-cholagogic effect in human beings suffering from biliary insufficiency, which consists in internally administering to a living person suffering from biliary insufficiency one substance selected from the group consisting of the chemical compounds having the general formula:

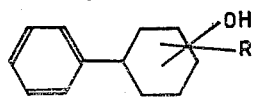

wherein R is

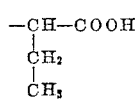

and the nontoxic, pharmacologically acceptable esters and salts thereof, in an amount sufficient to produce a choleretic action.

For administering the compounds of the present invention in order to produce a choleretic, non-cholagogic action in patients suffering from such biliary insufficiencies, the oral route has proven to be the most convenient one; the compounds of the present invention can also be administered by intravenous injections, whereas the intramuscular way is not recommendable in general.

For oral administration, the free acids are preferred, whereas for administration by injections, soluble salts, preferably sodium and potassium salts are used.

The daily dosage varies from 30 to 90 milligrams, and the duration of treatment depends, to a large extent, upon the state of the patient, the severity of the biliary insufficiency, and attendant complications; in general, the minimum duration of the treatment should be 10 days.

In a series of tests, patients suffering from biliary insufficiency associated with a variety of syndromes, were treated in accordance with the present invention by orally administering tablets containing 15 milligrams each of alpha-(1-hydroxy-4-phenyl cyclohexyl) butyric acid before meals. The dosage varied from 2 to 4 tablets twice daily and the duration of treatment from 3 to 25 days depending upon the condition of the patient and the response to the treatment. This medicament was perfectly tolerated by all patients and results were good in all cases except one where the patient suffered from cirrhosis of the liver.

In another series of tests the sodium salt of alpha-(1-hydroxy-4 phenyl cyclohexyl-1) butyric acid was administered intravenously, by a single injection using 3 cc. ampoules containing 30 milligrams of the salt to patients suffering biliary insufficiencies associated with a variety of syndromes. In these patients the rate of flow of bile was measured before and after the injection. In all cases there was a significant increase in the rate of flow, being twice the normal value in some instances. The choleretic action lasted from 10 to 20 minutes approximately, after which the rate of flow returned to the normal value. The presence of cholecystic bile was never observed, even in cases of cholecystic lithiasis, thereby confirming the non-cholagogic action. The compounds of the present invention have proven to be safe, reliable and effective choleretic agents and did not exhibit any toxic or undesirable side effects in the patients referred to above, irrespective of the form of administration.

The acids of the present invention can be prepared preferably, by saponifying in an alkaline environment, the esters thereof: these latter are prepared by refluxing for at least 45 minutes and in the presence of elemental zinc, a reaction mixture formed by the phenyl-cyclohexanone corresponding to the desired ester and ethyl-alphabromo-butyrate. The reacted mixture is then hydrolyzed at a temperature of about 0° C. with diluted sulphuric acid, is extracted several times with ether, the ethereal extracts are combined, the solvent is distilled off and the thusly obtained ester is subjected to alkaline saponification to recover the corresponding acid.

More particularly, if it is desired to prepare the alpha-(1-hydroxy-3-phenylcyclohexyl-1)-butyric acid, 3-phenyl-cyclohexanone will be used in the starting reaction mixture, whereas 4-phenylcyclohexanone will be used in the starting mixture if it is desired to prepare the alpha-(1-hydroxy-4-phenylcyclohexyl) butyric acid, and in a quite similar way for the other compounds of the present invention.

The preparation of the compounds according to the invention will be illustrated by the following examples, it being understood that no claim is intended to be made herein to the method of preparation.

EXAMPLE 1

*Alpha-(1-Hydroxy-3-Phenylcyclohexyl-1) Butyric Acid*

A 100 mil three-necked flask, fitted with a reflux condenser ended by a tube containing CaCl₂, and a stirring device is charged with 5.50 grams (0.029 mole) of 3-phenyl-cyclohexanone and 6.20 grams (0.032 mole) of ethyl-alpha-bromo butyrate dissolved in 25 mls. of abs. benzene, together with zinc dust prepared according to Reformatzky.

The reaction mixture is brought to a boil on a water-bath and refluxed for one hour.

Upon cooling the mixture is hydrolyzed by pouring it over crushed ice and diluted sulphuric acid, allowed to stand for 2 hours and extracted three times with 50 mls. of ether each time.

The combined ethereal extracts are washed with water and dried over anhydrous sodium sulphate. The mixture is now filtered, the solvent is distilled off and the oily residue is distilled, under reduced pressures, in a Claisen apparatus. The head fractions are discarded and a product which distils at 169° C.–172° C. under an absolute pressure of 1.5 millimeters of mercury is collected. Yield 8 grams, that is, 87.5% of theory.

This is the ethyl ester of the alpha-(1-hydroxy-3-phenyl-cyclohexyl-1) butyric acid.

To prepare the acid corresponding to said ester, 8.00 grams of the ethyl ester of alpha-(1-hydroxy-3-phenyl-cyclohexyl-1)-butyric acid are refluxed for 6 hours with 2 grams of NaOH in 60 mls. of 50% aqueous ethanol. The mixture is allowed to cool at room temperature, the major fraction of alcohol is removed under a vacuum, the mixture is taken up with 50 mls. of water and filtered with animal charcoal, after which it is acidified to Congo red with aqueous hydrogen chloride.

An oily substance precipitates and this is extracted three times with 50 mls. of ethyl ether each time.

The ethereal extracts are combined and dried over anhydrous sodium sulphate overnight.

The reaction mixture is now filtered and the solvent is evaporated. The alpha-(1-hydroxy-3-phenylcyclohexyl) butyric acid is an oily liquid having a pale yellow color.

Yield 4.1 grams, that is, 57% of theory.

For $C_{16}H_{21}O_3$: Calcd.—C=73.53%; H=8.10%. Found—C=73.50%; H=8.45%.

EXAMPLE 2

*Alpha-(1-Hydroxy-4-Phenylcyclohexyl-1) Butyric Acid*

A 100 mls. three-necked flask equipped with reflux condenser ended CaCl₂ tube and a mechanical stirrer is charged with 10.1 grams (0.058 mole) of 4-phenyl-cyclohexanone and 11.1 grams (0.057 mole) of ethyl alpha-bromo butyrate in 36 mls. of abs. benzene, with 4.1 grams (0.063) of zinc dust prepared according to Reformatzsky.

Upon heating the mixture at a temperature of about 60° C. a tumultous reaction takes place: as the reaction has been completed, the mixture is refluxed for 45 mins. The cold reaction mixture is hydrolyzed by pouring it over crushed ice aqueous sulphuric acid.

The mixture is allowed to stand for 2 hours and extracted three times with 30 mls. of benzene each time.

The benzene extracts are combined, washed with water and dried over anhydrous sodium sulphate.

The mixture is filtered, the solvent is evaporated under vacuum and the oily residue is distilled under vacuum in a Claisen apparatus. The head fraction is discarded and the ethyl ether of alpha-(1-hydroxy-4-phenylcyclohexyl-1) byturic acid is collected. It boils at 175°–180° C. under a pressure of 1.5 millimeters of mercury.

Yield 10.7 grams, that is, 64% of theory.

To prepare the alpha-(1-hydroxy-4-phenylcyclohexyl-1) butyric acid, 10.7 grams (0.037 mole) of ethyl ester thereof are refluxed for 6 hours with 2.7 grams (0.068 mole) of NaOH dissolved in 70 mls. of 50% aqueous ethanol.

The mixture is cooled, the solvent is removed under vacuum, then the mixture is taken up with 70 mls. of water, filtered with animal charcoal and acidified to Congo red with aqueous hydrogen chloride.

After cooling on ice, the crystalline ppte. is dried by suction and washed with a small amount of iced water.

Yield 7.5 grams, that is, 77% of theory.

The raw crystalline product is recrystallized from 90 mls. of boiling ligroin and filtered, while still hot, with animal charcoal.

The melting point is 157° C.

Final yield 5.2 grams, that is, 54% of theory.

For $C_{16}H_{21}O_3$: Calcd.—C=73.53%; H=8.10%. Found—C=73.72%; H=8.57%.

The invention has been described with reference to a few operative examples thereof given by way of illustration and clarification only, and it is not desired that the scope of the invention be limited except that in and by the claims appended therein.

What we claim is:

1. The method of producing a choleretic non-cholagogic effect in human beings suffering from biliary insufficiency, which consists in administering to such patients a daily dosage of from about 30 milligrams to about 90 milligrams of a compound selected from the group consisting of the compounds having the general formula:

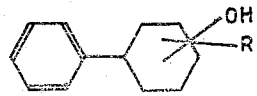

wherein R is

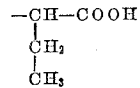

and non toxic pharmacologically acceptable esters and salts thereof.

2. The method as set forth in claim 1 in which the compound is alpha-(1-hydroxy-4-phenyl cyclohexyl-1) butyric acid.

3. The method as set forth in claim 1 in which the compound is the sodium salt of alpha-(1-hydroxy-4-phenyl cyclohexyl-1) buhyric acid.

4. A composition in tablet form for producing a choleretic non-cholagogic effect in human beings, consisting essentially of a pharmaceutical carrier and at least 15 milligrams of alpha-(1-hydroxy-4-phenylcyclohexyl-1) butyric acid as the added choleresis-promoting agent.

5. A composition in injectible form for producing a choleretic non-cholagogic effect in human beings, consisting essentially of an aqueous, injectable pharmaceutical carrier and at least 30 milligrams of a water-soluble nontoxic, pharmaceutically acceptable salt of alpha (1-hydroxy-4-phenylcyclohexyl-1) butyric acid as the added choleresis-promoting agent.

References Cited in the file of this patent

UNITED STATES PATENTS

| | | |
|---|---|---|
| 2,426,276 | Meiser | Aug. 26, 1947 |
| 2,681,911 | Cusic | June 22, 1954 |
| 2,681,912 | Cusic | June 22, 1954 |
| 2,893,915 | Cavallito | July 7, 1959 |

OTHER REFERENCES

Redel et al.: Bull. Soc. Chim. Biol., vol. 37, pp. 1189–94, 1955, abstract in Chemical Abstracts, vol. 51, 1957, #8889e.

Barre: Compt. Rend., Soc. Biol., vol. 149, pp. 843–5, 1955, abstract in Chemical Abstracts, vol. 51, 1957, #2848f.